March 18, 1952 W. B. HEINZ 2,589,251
FLUID OPERATED MEASURING OR CONTROL APPARATUS
Filed Aug. 24, 1945 5 Sheets-Sheet 1

INVENTOR
Winfield B. Heinz

March 18, 1952  W. B. HEINZ  2,589,251
FLUID OPERATED MEASURING OR CONTROL APPARATUS
Filed Aug. 24, 1945  5 Sheets-Sheet 3

WITNESS:

INVENTOR
Winfield B. Heinz
BY
ATTORNEYS.

March 18, 1952  W. B. HEINZ  2,589,251
FLUID OPERATED MEASURING OR CONTROL APPARATUS
Filed Aug. 24, 1945  5 Sheets-Sheet 5

INVENTOR
Winfield B. Heinz
BY
ATTORNEYS.

Patented Mar. 18, 1952

2,589,251

UNITED STATES PATENT OFFICE 2,589,251

FLUID OPERATED MEASURING OR CONTROL APPARATUS

Winfield B. Heinz, Bound Brook, N. J., assignor, by mesne assignments, to Reconstruction Finance Corporation, Philadelphia, Pa., a corporation of the United States Application August 24, 1945, Serial No. 612,505

8 Claims. (Cl. 73—37.5)

This invention relates to fluid operated measuring or control apparatus of the type designed to produce a pressure usable for either measuring or control purposes which is a function of a fluid resistance, this in turn being responsive to a dimension or displacement which is to be measured or which is to effect a controlling action.

The invention is particularly designed for the utilization of elastic fluids and in particular air, and to simplify the following description, terms will be used implying the use of air as the operating fluid, it being understood, however, that the invention is equally applicable to the use of other elastic fluids or liquids.

In particular, the invention relates to a pneumatic bridge arrangement in which a variable resistance is provided to give rise to a pressure usable for measuring or control purposes. Such a resistance may be provided, for example by the control of escape of air through an orifice. The size of this orifice may be a function of a dimension of a body, as in gauging applications, or may be the function of a displacement of an element which is, in turn, a function of some physical quantity such as rate of flow, temperature, pressure, displacement, time or the like. In accordance with the invention the variable resistance thus provided forms part of a bridge circuit operated in such fashion as to be balanced manually or automatically to give rise to an indication, preferably in the form of an output pressure, the value of which will be related in predetermined fashion with the physical quantity or characteristic to be observed or to effect control. While the invention contemplates in its broadest aspect a novel bridge arrangement it also relates to the elaboration of such an arrangement to provide stability, amplification and other characteristics rendering it generally industrially usable.

The objects of the invention just indicated together with other objects particularly relating to details of construction and application of the invention will become apparent from the following description read in conjunction with the accompanying drawings in which.

Figure 1:
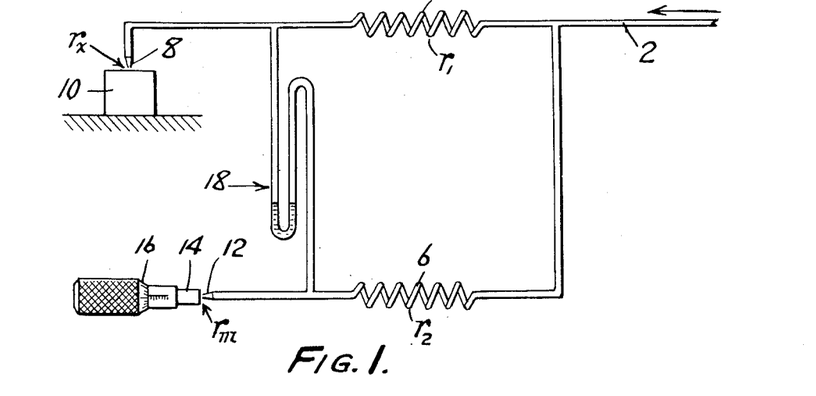
Figure 1 is a diagram illustrating a simple embodiment of the invention, particularly illustrative of the basic principle thereof.

Referring first to Figure 1, the basic pneumatic circuit of the present invention is illustrated therein, this comprising a pneumatic bridge supplied by air under pressure from a line 2. This line feeds air to a parallel arrangement of resistances 4 and 6, preferably identical. From the resistance 4 the flow takes place through a variable resistance which is conventionally illustrated as comprising a nozzle 8 in close relationship to a piece of work 10 which is to be gauged. The resistance 6 delivers its flow through a nozzle 12 which may be closed to a varying degree by the ram 14 of a micrometer 16. The output ends of the resistances 4 and 6 are connected by a manometer 18.

Assuming the resistances $r_1$, and $r_2$ of the resistance elements 4 and 6 to be identical, if a piece to be gauged is placed in close relationship to the nozzle 8 to give rise to a resistance $r_x$, there will, in general, appear a pressure differential across the manometer. If now the micrometer is adjusted to reduce to zero the pressure differential across the manometer then the resistance $r_m$ will be equal to the resistance $r_x$, the bridge being balanced. The setting of the micrometer will then be related to the dimension of the piece being gauged.

The foregoing simple embodiment of the invention is obviously of substantial usefulness inasmuch as the nozzles 8 and 12 can be readily so dimensioned that a given movement of the micrometer screw can be representative of a much smaller dimension to be gauged. Furthermore, such a gauge is applicable to a surface adjacent to the nozzle 8 which may be highly polished or otherwise subject to damage or distortion if it was touched by a mechanical gauging element.

The resistances $r_1$ and $r_2$ need not, of course, be identical. However, this is preferable if measurements of change of dimension are to be made rather then mere comparisons, in order to maintain a linear relationship between the micrometer reading and the work piece dimensions. Pneumatic resistances have non-linear pressure ratio characteristics as the up stream pressure changes. The shapes of these curves are unlike unless the resistances are physically identical. It is, therefore, ordinarily desirable that the pairs of resistances be equal or approximately so as indicated above.

It may be noted that since all the readings are taken with zero pressure differential across the manometer the readings will be independent of the supply pressure in the line 2.

Figure 2:
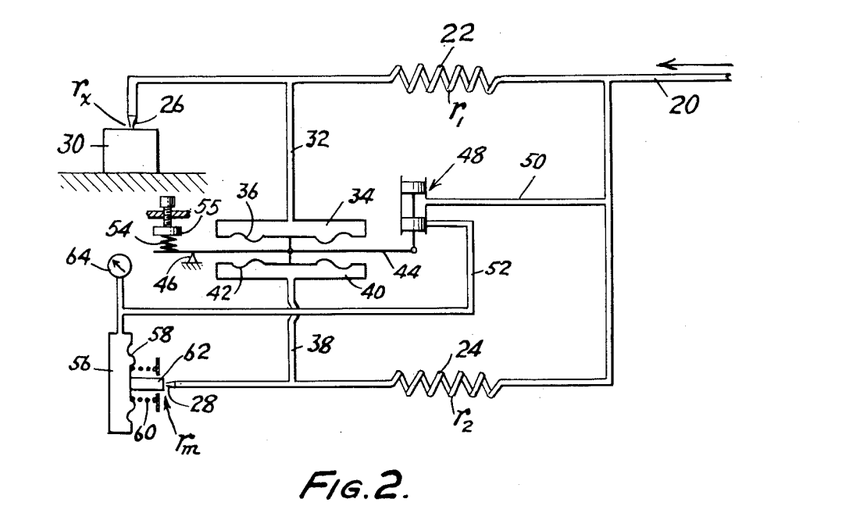
Figure 2 is a similar diagram but illustrating the automatic balancing of the circuit to give rise to an indicating or control pressure which is a function of a variable condition.

Except for simple gauging devices of the type indicated, it is desirable that there be presented automatically to an observer on a suitable gauge a reading which is indicative of the resistance $r_x$ without requiring manipulation such as of a micrometer. Figure 2 illustrates a refinement of the basic circuit which will give rise to an output pressure readable on a gauge for the purpose of indicating the value of $r_x$ or the dimension of a piece to be gauged to which $r_x$ is functionally related. Furthermore, the output pressure in a case such as this may be utilized for control purposes.

In Figure 2 a supply of air under pressure entering at 20 is fed to the parallel resistances 22 and 24. From the former it passes through the nozzle 26 which is closely approached by the piece 30 to be gauged. Connected between the nozzle 26 and the resistance 22 through a line 32 is a chamber 34 closed by a flexible diaphragm 36 of the so-called slack type, i. e., offering substantially no stiffness opposing its distortion. Similarly connected by a line 38 between the resistance 24 and a nozzle 28 is a second chamber 40 also having a slack diaphragm 42. The two diaphragms 36 and 42 are connected in opposition to each other to a lever 44 fulcrumed at 46 and arranged to operate a balanced pilot valve 48 which receives air through a connection 50 from the supply line 20 and has an outlet passage 52 which, by movement of the pilot valve downwardly, is arranged to receive air from the space between the pistons of the valve or, upon movement of the valve upwardly, is connected to the atmosphere to provide an exhaust. It will be understood that the valve 48 is merely diagrammatic and could be replaced by other valves well known to the art which, upon a minimum of movement of the valve and with a minimum of friction, will serve to provide the alternative connections just described. A spring 54 is provided capable of adjustment to support the overhanging portion of the lever 44, the weight of the moving parts of the valves and the weights of the diaphragms 46 and 42, the result being such that equal pressures in the chambers 34 and 40 will result in a neutral position of the pilot valve. This spring 54, and similar springs hereafter referred to, may be made adjustable, for example, by an adjustable screw abutment 55, to provide other than equality in pressures under equilibrium conditions.

The line 52 is connected to a chamber 56 provided with a diaphragm 58 which carries a ram 62 forming a baffle for the nozzle 28. A spring 60 opposes movement of the ram toward nozzle closing position. A gauge 64 is provided to give an indication of the pressure in the chamber 56 and, as will be evident, is representative of a connection from which a controlling pressure may be taken.

The resistances are designated in Figure 2 to correspond with the equivalent ones in Figure 1. It will be evident that the circuit of Figure 2 will result in an automatic balance of the bridge producing equal pressures in the chamber 34 and 40 if their diaphragms are of equal area, and correspondingly positioning the ram 62 to provide a resistance $r_m$ which will be equal to $r_x$ if $r_1$ is equal to $r_2$. The pressure existing in the chamber 56 will then be a function of $r_x$ or of the dimension of which this resistance is in turn a function. As indicated previously, the resistances 22 and 24 need not be equal, nor in the present case need the areas of the diaphragms 36 and 42 be equal. By a suitable choice of the constants of the arrangement the pressure at 64 may be caused to show large variations with a minor change of the resistance at the gauging point. While linearity of the response may be provided this need not necessarily be the case and for various purposes the dial on the gauge may be made non-linear and may be calibrated in terms of the dimensions being gauged.

An arrangement of elementary variety such as that of Figure 2 is subject to certain limitations. There may be objectionable friction in the pilot valve; and the proportional action which is involved may introduce departures from exact zero in the differential pressure across the bridge known as "droop" or "offset" from the control point. In order to overcome such disadvantages a double stage system such as that illustrated in Figure 3 can be used.

Figure 3:
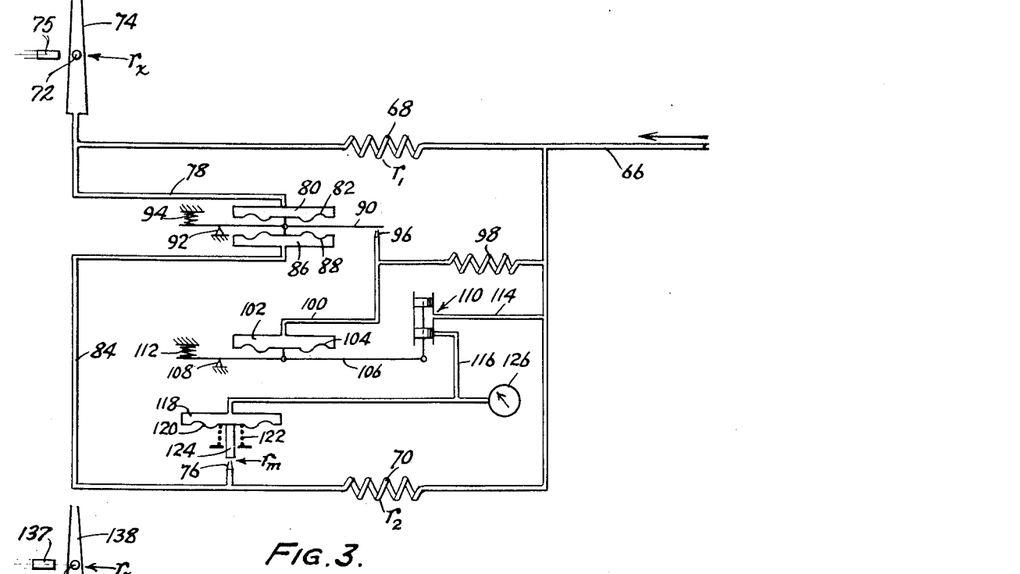
Figure 3 is a diagram showing a further improvement of the basic circuit.

In Figure 3 the supply of air under pressure from the line 66 is fed to the parallel arrangement of resistances 68 and 70 as in the preceding modifications. The arrangement of Figure 3 is adapted to respond to a much less critical or limited condition of $r_x$ than the preceding modifications and consequently $r_x$ is illustrated as provided by the obstruction to flow presented by a movable element such as a ball 72 in a tapered tube 74. This ball 72 may be positioned by a movable element by being formed of magnetic material so as to be adjustable in the tube 74 by an external magnet 75 connected to the part the position of which is to give rise to the response of the system. Since the particular fashion in which the ball or similar element 72 is moved is not part of the present invention this need not be described in detail. Reference may be made, however, to the joint application of William Melas and myself, Serial Number 553,700, filed September 12, 1944, now Patent No. 2,475,630 issued July 12, 1949 in which there is illustrated a flow meter in which a ball such as 72 is adjustable in a tapered tube in accordance with flow. Reference may also be made to my prior application, Serial Number 561,073, filed October 30, 1944, in which both similar and alternative variable resistances are disclosed which are responsive to displacements and which may be substituted for the system diagrammed at 72, 74. In general, it may be said that a variable resistance $r_x$ is provided which is a function of some physical quality translatable into a displacement of a flow controlling element. A chamber 80 is connected by a line 78 to a point between the resistance 68 and the variable resistance. This chamber 80 is provided with a slack diaphragm 82. A second opposing chamber 86 provided with a slack diaphragm 88 is connected by a line 84 between the resistance 70 and a nozzle 76. The two diaphragms 82 and 88 are connected in opposed relationship to each other by a lever 90 fulcrumed at 92 and acted upon by a spring 94 balancing the weight of the lever and the weights of the diaphragms. The lever 90 provides a baffle closely adjacent to a nozzle 96 which is supplied with air from line 66 through a resistance 98. A chamber 102 is connected by a line 100 between the resistance 98 and the nozzle 96 and has a diaphragm 104 acting upon a lever 106 fulcrumed at 108 and arranged to operate a pilot valve 110, a spring 112 serving to balance the weight of the lever, diaphragm and pilot valve. The pilot valve is supplied with air through the connection 114 and controls both the supply and venting of the line 116 connected to a chamber 118 having a diaphragm 120 opposed by a spring 122 and carrying a ram 124 which forms a baffle for the nozzle 76.

A comparison of Figure 3 with Figure 2 will reveal that the balancing of the system is now entirely independent of friction and the necessity for an actual, though small, displacement of the pilot valve. The pilot valve is now operated through an amplifying system whereas the balancing of the system involves in it only the minute motion of the baffle 90 which is subject to negligible pressure by the jet issuing from the nozzle 96 and may be readily constructed to involve only a negligible amount of friction. The movements of such a baffle to produce quite large variations in pressure in the chamber 102 may be of the order of only a fraction of a thousandth of an inch. Obviously, in this system the automatic balancing will provide at 126 a pressure which is a measure of the resistance $r_x$ and which may be made to have a very large rate of change with respect to $r_x$.

The device illustrated in Figure 3 in view of the arrangement of the primary element of the amplifier may, under certain circumstances, be unable to maintain stable conditions in the circuit. Improvement in stability can be effected by the arrangement illustrated in Figure 4. This also involves a bridge potential regulator to prevent undue increase of the pressure drop across the variable resistance $r_x$.

Figure 4:
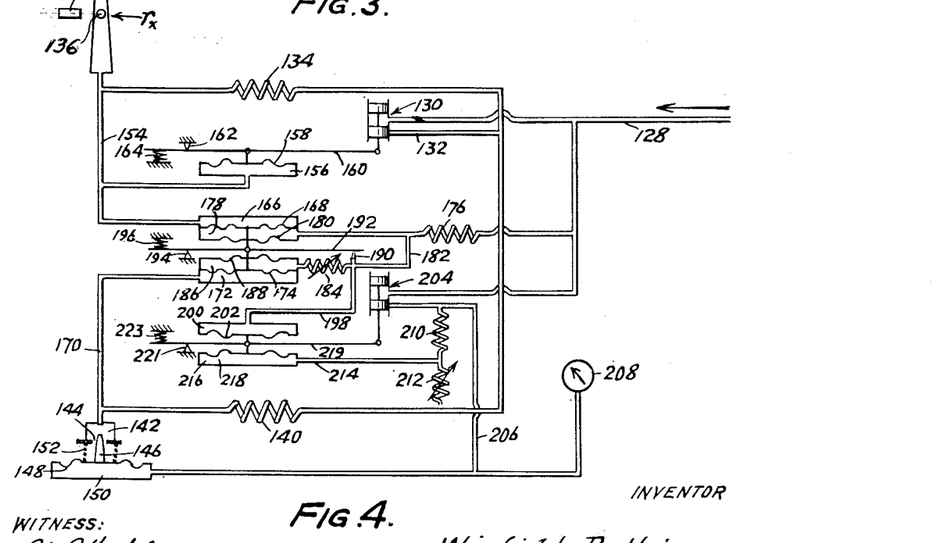
Figures 4 and 5 are further diagrams showing additional improvements of the circuit to secure still other desirable characteristics thereof.

The line 128 supplies air to a pilot valve 130, the outlet line 132 of which feeds air to the parallel resistances 134 and 140. As in the case of Figure 3 the resistance 134 supplies air to a tapered tube 138 in which moves a ball 136, positioned by a movable magnet 137, providing the variable resistance to flow. The resistance 140 in this modification supplies air to a mechanism which is detailed in Figure 6. The air is supplied to a chamber 142 provided with an opening 144 into which projects a pin 146 shaped as hereafter described, carried by the diaphragm 148 of a chamber 150, the diaphragm being urged in opposition to pressure within the chamber by a spring 152.

A line 154 connected between the resistance 134 and the tapered tube 138 is connected to a chamber 156 provided with a flexible diaphragm 158 which is connected to a lever 160 joined to the pilot valve and having a fulcrum at 162. A compensating spring 164 balances the mechanical parts of the pilot valve system. As will be evident from the diaphragm, downward movement of the pilot valve upon decrease of pressure in the chamber 156 will provide a flow of air into the line 132 while an upward movement under the condition of increase of pressure in the chamber 156 will vent the line 132 to the atmosphere.

The connection 154 also runs to the chamber 166 which is closed by a slack diaphragm 168. A chamber 172 closed by a slack diaphragm 174 indicated as having the same area as the diaphragm 168 is connected by the line 170 between the resistance 140 and the chamber 142. A resistance 176 is interposed between the supply line 128 and a chamber 178, the upper side of which is closed by the diaphragm 168 and the lower side of which is closed by a slack diaphragm 180 of smaller area than the diaphragm 168. Between the resistance 176 and the chamber 178 is connected a line 182 which, in turn, is connected through a variable resistance 184 to a chamber 186, the lower side of which consists of the diaphragm 174 while the upper side is closed by a slack diaphragm 188 of smaller area which may be that of the diaphragm 180. A nozzle 190 connected to the line 182 has a baffle provided by a lever 192 fulcrumed at 194 and connected to the series of diaphragms 168, 174, 180 and 188. A spring 196 balances the weight of the lever 192 and its connected elements.

A line 198 connects line 182 with a chamber 200 which is closed by a slack diaphragm 202. A pilot valve 204 fed by air from the supply line 128 is connected through a line 206 to the chamber 150 and to a gauge 208 or other connection for the application of output pressure. A pair of resistances 210 and 212, the latter being adjustable, are arranged in series to vent the line 206 to the atmosphere. A connection 214 from the junction point of these resistances leads to the chamber 216 which is provided with a slack diaphragm 218. The two diaphragms 202 and 218 are connected to a lever 219 fulcrumed at 221 and connected to the pilot valve 204. A spring 223 compensates for the weight of this lever and its associated parts.

Stability of operation of the system just described is effected through the follow-up action of the nozzle pressure acting in chamber 178 while droop is avoided by the presence of reset chamber 186 and connecting resistance 184. As will be evident, any change of pressure at the nozzle 190 appears substantially immediately in the chamber 178. Such change, however, will be delayed in appearing in the chamber 186 due to the presence of the resistance 184. The action accordingly is as follows:

An upward movement of the ball in the tapered tube will increase the differential pressure across the bridge which will move the baffle 192 toward the nozzle. The consequent increase in nozzle pressure is then applied substantially immediately to the chamber 178 to produce a balance. The nozzle pressure is thus changed substantially instantaneously by an amount exactly proportional to the change in the differential pressure across the bridge, the proportionality being fixed by the ratio of the areas of the opposing diaphragms 168 and 180. When the pressure at the nozzle increases, a flow of air will take place through the resistance 184 and the downward pressure upon the diaphragm 174 will increase so that in view of the excess area of the diaphragm 174 over that of diaphragm 188 the baffle will be moved further toward the nozzle and the nozzle pressure will further increase. This will continue until the pressure differential of the bridge has once more been restored exactly to zero and the pressures in the chambers 178 and 186 will once more be equal but at a higher new value than before.

The pressure appearing at 199 is amplified through the system comprising the chambers 200 and 216, the pilot valve 204 and the series resistances 210 and 212. This amplifying action, which may be caused to produce a very much larger pressure change in the line 206 than at the nozzle 190, is in accordance with the disclosure of my application, Serial Number 561,073, filed October 30, 1944, to which reference may be made for a discussion of details of the amplifier action. In brief, it may be stated that if the diaphragms 202 and 218 are of equal area, amplification is provided in the ratio of the sum of the resistances at 210 and 212 to the resistance at 212. This ratio constitutes an amplification factor which may readily be made quite high.

The bridge potential regulator which comprises the chamber 158 and the pilot valve 130, connected as indicated, is provided to prevent the pressure drop across the ball 136 from becoming high enough to blow the ball away from its magnetic lock with the displaceable element which it follows, or alternatively, to prevent such pressure on the ball as may cause it to affect its driving element. While useful for this particular purpose, such a regulator is desirable for many other applications where control of a pressure value is necessary. When the ball is in its lowest position, where the tapered tube area is large, a large bridge potential must be used in order that the rate of change of the pressure drop across the ball with respect to ball position will be sufficiently great. If that same high bridge potential was maintained, however, when the ball rises in the tube and the resistance $r_x$ increases, the pressure drop across the ball might become so great as to give rise to the undesirable conditions mentioned above. The bridge potential regulator avoids this difficulty by maintaining the pressure drop in the tube 138 substantially constant at all positions of the ball.

Figure 5:
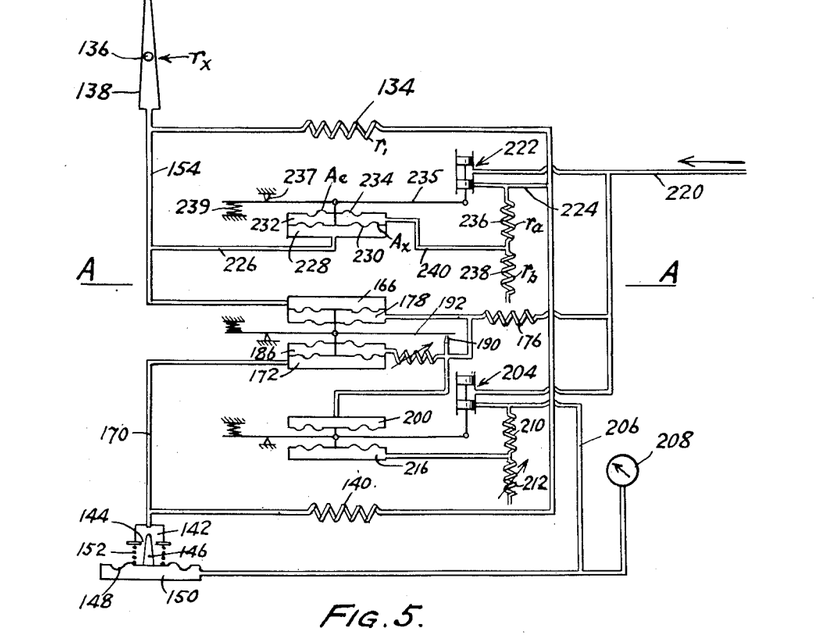

The foregoing condition, however, is still not completely satisfactory since if the pressure drop across the ball is maintained substantially constant the rate of change of this pressure drop with respect to the ball position will be much lower when the ball is in the large end of the tube than when it is in the small end. The sensitivity or responsiveness of the balancing regulator depends upon the rate of change of the pressure drop across the ball with respect to its displacement. In order to maintain substantially equal responsiveness in the regulator throughout the full range of ball position it is desirable to have the pressure drop across the ball greater when the ball is at the bottom than when it is at the top of the tube or, speaking more generally, when $r_x$ is small rather than large. Figure 5 illustrates an addition to the system of Figure 4 which accomplishes this end. Comparison of these figures will reveal that the portion of Figure 5 below the line AA is the same as in Figure 4 and the corresponding parts have been given the same reference numerals and need not be further described. In the case of Figure 5 the supply line 220 feeds a pilot valve 222 which, in turn, feeds the resistances through a line 224 corresponding to the line 132. A line 226 joins the line 154 to a chamber 228 closed by a diaphragm 230. Above the diaphragm 230 is a second chamber 232 closed by a diaphragm 234 of smaller area than 230. Both of these diaphragms are connected to a lever 235 which is connected to the moving valve element of the pilot valve 222, this lever being fulcrumed at 237 and balanced, together with its associated parts, by a spring 239. Series resistances 236 and 238 vent the line 224 to the atmosphere. Between their junction and the chamber 232 is a connecting line 240.

By the foregoing arrangement a fraction of the bridge pressure is applied to act downwardly on an effective area equal to the difference between the areas of the diaphragms 230 and 234. As a consequence, the pressure drop across the ball 136 and the input pressure to the system rise together as the ball moves toward the large end of the tube. If too much positive feed back is provided the regulator would move through its full stroke opening the pilot valve wide. To avoid this condition design must be made as follows:

If $\mu$ is defined as $$\frac{r_a + r_b}{r_b}$$

and $\mu_x$ is defined as $$\frac{r_x + r_1}{r_x}$$

the system will be stable only when: $\mu A_x > \mu_x A_1$, in which $A_1 = A_x - A_c$, and in which $A_x$ is the area of diaphragm 230 and $A_c$ is the area of diaphragm 234.

Figures 6, 7, 10:
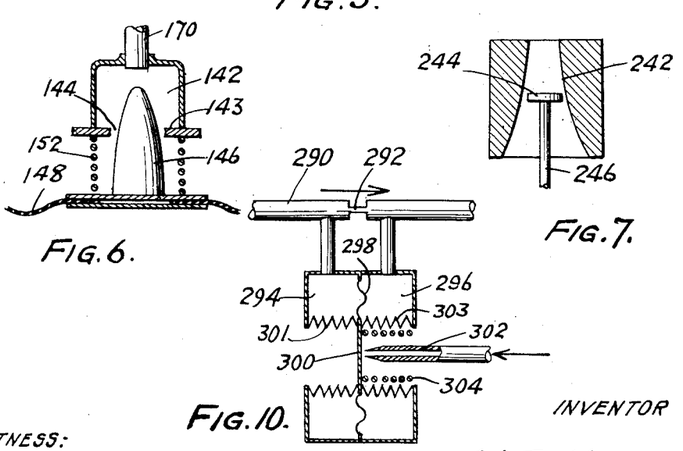
Figure 6 is a fragmentary sectional view illustrating a preferred form of automatically adjustable resistance.
Figure 7 is a similar view showing an alternative type of adjustable resistance.
Figure 10 is a sectional diagram illustrating the application of the invention to flow measurement.

As has been noted heretofore, Figures 4 and 5 show a needle valve arrangement to provide the balancing resistance, this being detailed in Figure 6. It has been indicated above that the output pressure of the various systems is functionally related to the resistance $r_x$ and while this relationship may, in some systems, be linear, what is normally desired is a variation of output pressure which bears some desired predetermined relationship to the quantity upon which $r_x$ depends and to which $r_x$ itself may not be linearly related. It is possible, however, to secure any desired characteristic of response of the output pressure by the proper design of a needle valve such as 146 to secure a properly corresponding relationship between the resistance through the orifice 144 and the movement of the diaphragm 148. Thus the output pressure may be given a strictly linear relationship to the variations in the quantity controlling $r_x$; or alternatively any desired non-linear scale may be provided. Figure 7 illustrates an alternative to the construction of Figure 6 and involves the movement of a flow impeding member 244 within a properly shaped opening 242. The member 244 is connected through a stem 246 to a diaphragm such as 148.

Figure 8:
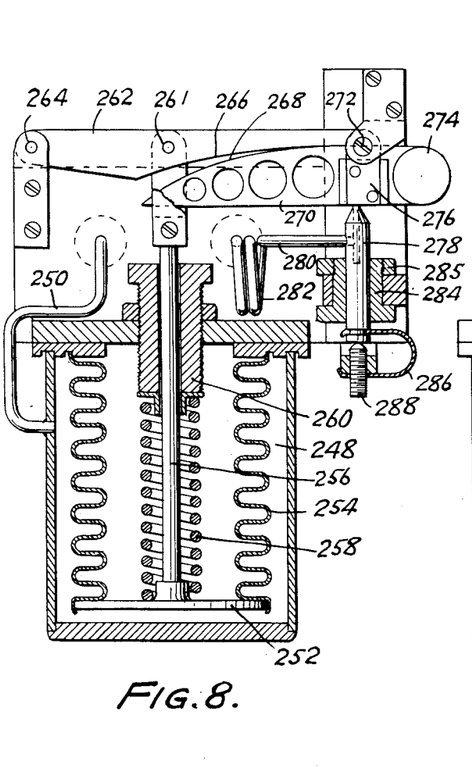
Figure 8 is a vertical section through a circuit element showing the fashion in which the functional form of a response may be predetermined.

From the manufacturing standpoint, however, arrangements such as illustrated in Figures 6 and 7 are not particularly satisfactory because of the high degree of accuracy to which they must be manufactured. A preferable arrangement from the manufacturing standpoint is that illustrated in Figures 8 and 9. A chamber 248 arranged for connection through a tube 250 corresponds to the chambers 150 in Figures 4 and 5, i. e., is subject to the delivered pressure of the system. This chamber is closed by a bellows indicated at 254 secured to the top of the chamber and having its lower end closed by a plate 252. A stem 256 extends up from the plate 252 through an adjusting screw 260 which regulates the force exerted downwardly on the plate 252 by a spring 258. The interior of the bellows is open to the atmosphere. The rod 256 is pivoted at 261 to a lever 262 which is fulcrumed at 264. The lower edge of the lever 262 is formed as a cam 266, arranged to engage in rolling fashion with the cam edge 268 of a second lever 270 fulcrumed at 272 and provided with a counterweight 274 to urge it very lightly in a clockwise direction, the lever 270 being preferably of very light construction, the material being removed by the drilling of holes as indicated. A block 276 carried by the lever 270 provides a baffle adjacent to the outlet of a nozzle 278 arranged to receive air through a tube 280 which is desirably formed as a spiral at 282 to permit flexibility for its adjustment. This adjustment is conveniently effected by mounting the nozzle to slide in an eccentric bushing 284, the nozzle being held by a strong spring clip 286 in engagement with an adjusting screw 288. A simple nozzle and plane baffle thus constitute the resistance $r_m$. By adjustment of the eccentric bushing the position of the nozzle with respect to the pivot may be changed to secure any desired relation between the rate of change of angular position of the lever and the rate of change of displacement of the baffle from the nozzle opening, within the limits of adjustment. The two cooperating cams 266 and 268 may be readily accurately made to control to a high degree of precision a characteristic relationship between very small displacements of the baffle and the displacements of the plate 252 due to pressure changes in the chamber 248. This characteristic relationship may be easily made anything desired so as readily to secure an output pressure which is linearly related to $r_x$, or to any quantity to which $r_x$ is responsive, or some other relationship following a square law, a square root law, a logarithmic law or the like. It may be remarked that the cams illustrated in Figure 8 are those designed to give a square root characteristic.

Figure 9:
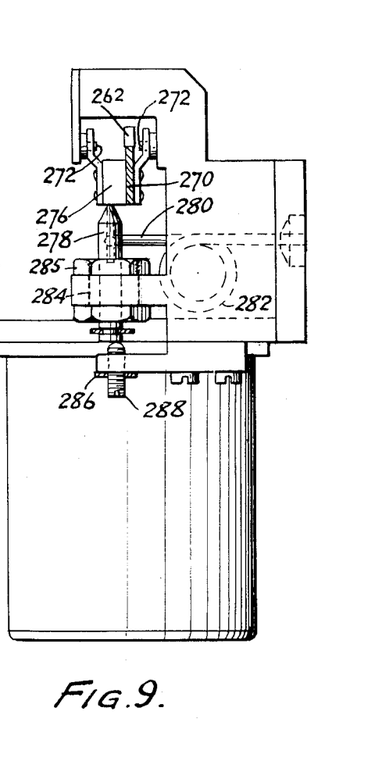
Figure 9 is a side elevation of the subject-matter of Figure 8.

As an example of the fashion in which $r_x$ may be made responsive to a quantity to be measured or used to effect control operations, there is illustrated in Figure 10 means for transmitting pneumatically the pressure drop across an orifice, nozzle or other head-creating element commonly used in fluid flow measurement. A passage is conventionally illustrated at 290 including a restriction 292, the pressure drop across which is to be used to give a measurement of flow. The opposite sides of the orifice 292 are joined to chambers 294 and 296 of annular form separated by a diaphragm 298 and interiorly bounded by bellows 301 and 303. A baffle 300 connected to the diaphragm cooperates with a nozzle 302. A spring 304 acts against the higher pressure in the arrangement. If this arrangement is substituted for the elements previously described to provide a resistance $r_x$, the output pressure, assuming linearity of $r_m$ with respect to $r_x$, should, to indicate a linear scale of flow, be provided by a mechanism such as illustrated in Figures 8 and 9 designed to give a transmitted pressure proportional to the square root of the orifice pressure drop so as to be directly proportional to the flow through the orifice.

Figure 11:
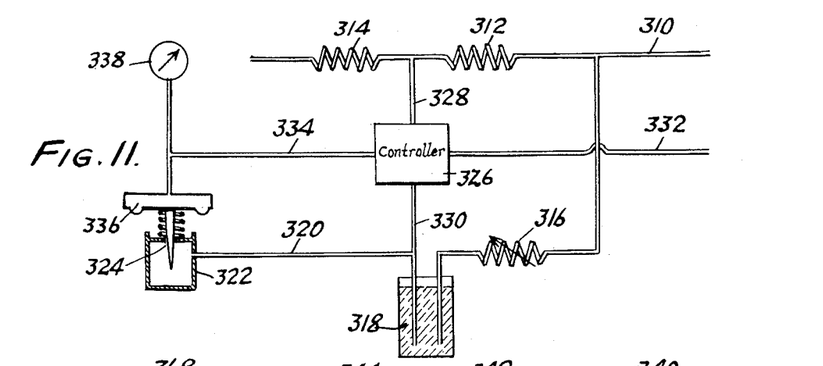
Figure 11 is a diagram illustrating the application of the invention to a gas analyzer.
Figure 12:
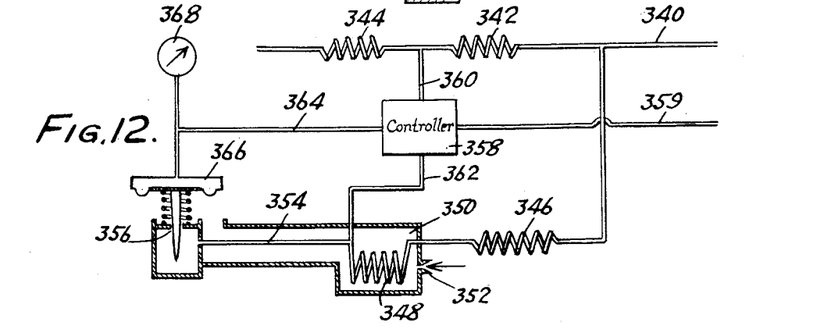
Figure 12 is a diagram illustrating the application of the invention to a calorimeter.
Figure 13:
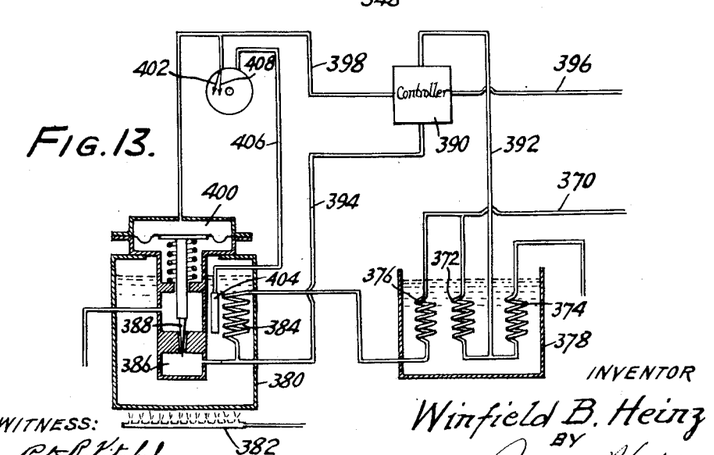
Figure 13 is a diagram illustrating the application of the invention to a viscosimeter.

The principles of the invention are applicable in many ways to measurement or control purposes as will be clear from consideration of Figures 11, 12 and 13 which show respectively application of the invention to a gas analyzer, a calorimeter and a viscosimeter.

Referring to Figure 11, a flow of a gaseous mixture containing a variable quantity of some particular constituent, of which the proportion in the mixture is to be determined or is to effect a controlling action, is supplied to a pneumatic bridge at constant bridge potential through the connection 310. The constant input pressure may be controlled in the fashion heretofore described. As an example of the type of gas mixture which may thus be introduced there may be cited flue gases which, previously dried, may have their carbon dioxide content determined and/or used to affect control of combustion. The gas mixture entering at 310 is divided, part of it going through series resistances 312 and 314 to the atmosphere and the remainder going through a resistance 316 into an absorber 318 in which the variable constituent may be absorbed or adsorbed by suitable physical or chemical material. The residual gas then passes through the line 320 to the balancing valve 322 providing a variable resistance at 324. A controller 326 of any of the forms heretofore described is connected through line 328 to the junction of resistances 312 and 314 and through the line 330 to the junction between the absorber 318 and the balancing valve 322. The controller is supplied with operating air or other fluid through the connection 332 and delivers in the fashion heretofore described a controlled pressure through connection 334 to the diaphragm chamber 336 which controls the balancing valve. The pressure required to position the balancing valve may be measured by a suitable indicating or recording instrument at 338 in place of which, or in addition to which, a connection may be provided for affecting some desired control in dependence upon the removable gas content of the mixture. The instrument 338 may, of course, be calibrated in terms of the percentage of the gas which is removed, since the null condition effected by the controller will be dependent upon the degree of absorption which takes place.

It is important that the controller be connected directly adjacent to the variable resistance instead of between the resistance 316 and the absorber 318 because otherwise the resistance of the absorber would be added to the leg of the bridge containing the adjustable resistance and would affect the balance. Desirably the absorber is of such type that throughout its range of usefulness it will provide a substantially constant resistance to flow. In view of the changes which may occur on reloading, the resistance 316 may be made adjustable, being calibrated against air or gas from which the absorbable constituent is removed prior to use of the apparatus.

In Figure 12 there is illustrated the application of the invention to a calorimeter which may be used either for continuous flows of fluids, the heats of combustion of which are to be determined, or for finite quantities of combustibles. A flow of any suitable heat absorbing fluid such as air or water is introduced at 340 at a substantially constant bridge potential. Part of this flows through the series resistances 342 and 344 to waste. The remainder passes through a resistance 346 in series with a passage conventionalized as a coil 348 and located in a furnace 350 being arranged in such fashion as to absorb substantially all of the heat which is produced therein. A fuel to be burned may be continuously introduced at 352. A line 354 from the passage 348 delivers the fluid to the variable resistance 356 desirably maintained at the temperature of the furnace. The controller 358 of one of the types heretofore described is connected to the junction of resistances 342 and 344 and between the passage 348 and the variable resistance 356. It is supplied with operating air or other fluid through 359 and delivers controlled pressure through the line 364 to the diaphragm chamber 366 controlling the variable resistance. A suitable pressure gauge 368 may be calibrated directly in terms of heat released within the combustion furnace. The change of viscosity of the heated air or other fluid provides a variation of pressure drop through variable resistance 356 for any particular position of the orifice-controlling valve member, which in operation is automatically controlled to provide a constant pressure in line 362.

Figure 13 represents a viscosimeter for the determination of the viscosity of a fluid as a function of temperature. The fluid enters the system at 370 at constant bridge potential. Part of it flows through the series resistances 372 and 374 to waste. The remainder passes through a third resistance 376. The resistances 372, 374 and 376 are maintained at a constant reference temperature, for example, as in a bath as indicated at 378. A second bath 380 is arranged to be heated, for example, by a burner 382 so that its temperature may be varied. The fluid from the resistance 376 passes through a coil 384 of negligible resistance in which it is brought to the temperature of the bath 380. From this coil 384 the fluid then passes into the chamber 386 and through the variable resistance offered by the balancing valve 388.

A controller 390 of one of the types described is connected by line 392 to the junction of the resistances 372 and 374 and by a line 394 to the up-stream side of the variable resistance. The controller which receives actuating fluid through connection 396 delivers a pressure 398 to effect balancing by acting upon the diaphragm of the chamber 400 controlling the variable resistance. The line 398 may be connected to operate one pen 402 of a two-pen recorder. The other pen of this recorder indicated at 408 is controlled by a thermometer element 404 through a connection 406. Thus on the recorder chart there may be simultaneously recorded the corresponding values of viscosity and temperature, the pressure actuating the pen 402 being a function of viscosity due to the variation of resistance by reason of change of temperature. The balancing valve passage should be so designed in accordance with the principles set forth above that its flow-pressure characteristic will be as nearly linear as possible so that it will be directly responsive to viscosity.

It will be evident from the above that the invention is quite broadly applicable to the fluid transmission or amplification of measurable quantities which, in some fashion or other, may be caused to provide an adjustable resistance to flow of fluid; or alternatively to measurements of fluid properties which may depend upon various quantities or characteristics which it is desired to measure or utilize for control purposes. The invention is, of course, equally applicable to liquid and elastic fluid systems.

What I claim and desire to protect by Letters Patent is:

1. In combination, a pair of fluid resistances, means for supplying fluid to said resistances in parallel, means providing variable resistances in series with the respective first mentioned resistances for the reception of fluid flowing therefrom, means responsive to a pressure difference between the respective junctions of the first and second mentioned resistances, and means including a fluid relay device operable by the last mentioned means to adjust one of the second mentioned resistances to produce a predetermined value of said pressure difference.

2. In combination, a pair of fluid resistances, means for supplying fluid to said resistances in parallel, means providing variable resistances in series with the respective first mentioned resistances for the reception of fluid flowing therefrom, means responsive to a pressure difference between the respective junctions of the first and second mentioned resistances, and means including a baffle controlled orifice operable by the last mentioned means to adjust one of the second mentioned resistances to produce a predetermined value of said pressure difference.

3. In combination, a pair of fluid resistances, means for supplying fluid to said resistances in parallel, means providing variable resistances in series with the respective first mentioned resistances for the reception of fluid flowing therefrom, means responsive to a pressure difference between the respective junctions of the first and second mentioned resistances, and means including a fluid pressure amplifier operable by the last mentioned means to adjust one of the second mentioned resistances to produce a predetermined value of said pressure difference.

4. In combination, means providing a pair of fluid resistances, means for effecting flow of fluid to said resistances in parallel, means providing fluid resistances in series with the respective first mentioned resistances for the reception of fluid flowing therefrom, means responsive to a pressure difference between the respective junctions of the first and second mentioned resistances, and means operable by the last mentioned means to adjust one of said resistances to produce a predetermined value of said pressure difference.

5. The combination of claim 4 in which said predetermined value of the pressure difference is substantially zero.

6. In combination, means providing a pair of fluid resistances, means for effecting flow of fluid to said resistances in parallel, means providing fluid resistances in series with the respective first mentioned resistances for the reception of fluid flowing therefrom, means responsive to a pressure difference between the respective junctions of the first and second mentioned resistances, means operable by the last mentioned means to adjust one of said resistances to produce a predetermined value of said pressure difference, and pressure responsive means controlling the pressure drop across another of said resistances.

7. In combination, means providing a pair of fluid resistances, means for effecting flow of fluid to said resistances in parallel, means providing fluid resistances in series with the respective first mentioned resistances for the reception of fluid flowing therefrom, means responsive to a pressure difference between the respective junctions of the first and second mentioned resistances, means operable by the last mentioned means to adjust one of said resistances to produce a predetermined value of said pressure difference, and pressure responsive means controlling the pressure at one of said junctions.

8. In combination, means providing a pair of fluid resistances, means for effecting flow of fluid to said resistances in parallel, means providing fluid resistances in series with the respective first mentioned resistances for the reception of fluid flowing therefrom, means responsive to a pressure difference between the respective junctions of the first and second mentioned resistances, means operable by the last mentioned means to produce a fluid pressure, and means responsive to the last mentioned fluid pressure to adjust one of said resistances in predetermined relationship to the last mentioned fluid pressure to produce a predetermined value of said pressure difference.

WINFIELD B. HEINZ.

REFERENCES CITED

The following references are of record in the file of this patent:

UNITED STATES PATENTS

| Number | Name | Date |
|---|---|---|
| Re. 19,276 | Wunsch | Aug. 14, 1934 |
| 1,558,530 | Wunsch | Oct. 27, 1925 |
| 2,021,053 | Englebright et al. | Nov. 12, 1935 |
| 2,132,338 | Ziebolz | Oct. 4, 1938 |
| 2,263,335 | Heinz | Nov. 18, 1941 |
| 2,266,566 | Poole | Dec. 16, 1941 |
| 2,290,527 | Bergtholdt | July 21, 1942 |
| 2,345,732 | Davies et al. | Apr. 4, 1944 |
| 2,350,058 | May | May 30, 1944 |

OTHER REFERENCES

Publication, "Relay Devices and Their Application to the Solution of Mathematical Equations," by H. Ziebolz, vols. 1 and 2. Published by the Askania Regulator Co., Chicago, Ill. Copyright 1940. (Copy in 73–205.) Vol. I, pages 3–5, vol. II, Figs. 1–10.